(12) United States Patent
Hager et al.

(10) Patent No.: US 7,248,208 B2
(45) Date of Patent: Jul. 24, 2007

(54) METHODS AND SYSTEMS FOR MAINTAINING A POSITION DURING HOVERING OPERATIONS

(75) Inventors: James R. Hager, Golden Valley, MN (US); David V. Hansen, Eden Prairie, MN (US); Curtis J. Petrich, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 250 days.

(21) Appl. No.: 10/865,407

(22) Filed: Jun. 10, 2004

(65) Prior Publication Data
US 2005/0275584 A1 Dec. 15, 2005

(51) Int. Cl.
*G01S 13/08* (2006.01)
(52) U.S. Cl. .................. 342/120; 342/63; 342/109; 342/99; 342/121; 342/192; 701/11
(58) Field of Classification Search ................. 342/120
See application file for complete search history.

(56) References Cited

U.S. PATENT DOCUMENTS

| | | | | |
|---|---|---|---|---|
| 2,711,529 | A | * | 6/1955 | Shanahan .................... 342/109 |
| 2,847,666 | A | * | 8/1958 | Berger ........................ 342/100 |
| 3,102,263 | A | | 8/1963 | Meyer |
| 3,105,234 | A | * | 9/1963 | Lurie et al. .................... 342/88 |
| 3,134,103 | A | * | 5/1964 | Flower ......................... 342/109 |
| 3,181,156 | A | * | 4/1965 | Ward ........................... 342/196 |
| 3,334,344 | A | * | 8/1967 | Colby, Jr. ...................... 342/84 |
| 3,860,925 | A | * | 1/1975 | Darboven, Jr. .............. 342/109 |
| 4,029,271 | A | | 6/1977 | Murphy et al. |
| 4,603,388 | A | | 7/1986 | Griffith et al. |
| 4,671,650 | A | | 6/1987 | Hirzel et al. |
| 4,714,928 | A | | 12/1987 | Schmitt |
| 4,801,110 | A | | 1/1989 | Skutecki |
| 5,001,646 | A | * | 3/1991 | Caldwell et al. ................ 701/7 |
| 5,109,230 | A | * | 4/1992 | Hassenpflug ................ 342/117 |
| 5,195,039 | A | * | 3/1993 | Gold et al. ..................... 701/7 |
| 5,361,072 | A | * | 11/1994 | Barrick et al. .............. 342/133 |

(Continued)

FOREIGN PATENT DOCUMENTS

GB 1583406 1/1981

(Continued)

OTHER PUBLICATIONS

Notification of Transmittal of the International Search Report and the Written Opinion of the International Searching Authority, or the Declaration with the International Search Report, Jul. 24, 2006, 5 pages.

*Primary Examiner*—Thomas H. Tarcza
*Assistant Examiner*—Matthew M. Barker
(74) *Attorney, Agent, or Firm*—Andrew Abeyta, Esq.; Armstrong Teasdale LLP

(57) ABSTRACT

A method for maintaining a position of a hovering vehicle that incorporates a radar altimeter is described. The method includes receiving signals at the radar altimeter based on a change of horizontal direction, operating the radar altimeter to generate a Doppler frequency spectrum based on the received signals, and determining a change in vehicle direction and velocity which will reduce a width of the Doppler frequency spectrum of the received signals. A radar altimeter which generates the Doppler frequency spectrum is also described.

19 Claims, 5 Drawing Sheets

U.S. PATENT DOCUMENTS

| | | | |
|---|---|---|---|
| 5,510,991 A * | 4/1996 | Pierson et al. | 701/11 |
| 5,596,323 A * | 1/1997 | Erhage | 341/155 |
| 5,793,327 A * | 8/1998 | Carnes et al. | 342/135 |
| 6,050,948 A * | 4/2000 | Sasaki et al. | 600/453 |
| 6,067,040 A * | 5/2000 | Puglia | 342/134 |
| 6,285,926 B1 | 9/2001 | Weiler et al. | |
| 6,480,763 B1 | 11/2002 | Lappos | |
| 6,583,733 B2 | 6/2003 | Ishihara et al. | |
| 6,731,234 B1 * | 5/2004 | Hager et al. | 342/94 |
| 6,897,804 B1 * | 5/2005 | Hager et al. | 342/120 |

FOREIGN PATENT DOCUMENTS

| | | |
|---|---|---|
| WO | 9857192 A1 | 12/1998 |

* cited by examiner

METHODS AND SYSTEMS FOR MAINTAINING A POSITION DURING HOVERING OPERATIONS

BACKGROUND OF THE INVENTION

This invention relates generally to movements of hovering vehicles, and more specifically, to methods and systems for maintaining a position during hovering operations.

Typical helicopter and other hovering vehicle maneuvers include maintaining a hover position defined by vertical and horizontal components. Maintaining a hover position is sometimes referred to as a hover hold. One specific example of a hover hold scenario is during rescue operations. It is of great benefit to the pilot, especially during turbulent or high wind conditions, to have an automatic hover hold system wherein motion is sensed and automatically corrected to provide average zero horizontal and vertical velocities. Because motion sensing with respect to the ground typically is desired, a radar velocimeter system is typically utilized in an automatic hover hold system. Known radar velocimeter systems typically utilize at least three narrow beam directional antennas providing directional Doppler ground velocity sensing. These narrow beam antennas are rather large in size as compared to, for example, an antenna for a radar altimeter.

In addition to the radar velocimeter system, a radar altimeter is typically used to determine altitude with respect to the ground. Known radar altimeters which operate in the altitude range associated with hover hold operations utilize both transmit and receive antennas. While effective, the two separate systems (radar velocimeter and radar altimeter) are costly, and the five antennas employed by such systems utilize a great deal of the surface area of the vehicle, lessening space available for installation of other systems. In addition, weight considerations of the two separate systems are also a potential problem to be considered.

BRIEF SUMMARY OF THE INVENTION

In one aspect, a method for maintaining a position of a hovering vehicle that incorporates a radar altimeter is provided. The method comprises receiving signals at the radar altimeter based on a change of horizontal direction, operating the radar altimeter to generate a Doppler frequency spectrum based on the received signals, and determining a change in vehicle direction and velocity which will reduce a width of the Doppler frequency spectrum of the received signals.

In another aspect a radar altimeter is provided. The radar altimeter comprises a receiver section that, in operation, outputs samples of radar return signals and a hover hold controller. The hover hold controller is configured to receive the samples, gate and integrate the samples, and generate and output a frequency spectrum having a width and a center frequency from the gated and integrated samples. The frequency spectrum width is based on a horizontal velocity of the vehicle incorporating the radar altimeter, and the center frequency of the frequency spectrum is based on a vertical velocity of the vehicle.

In still another aspect, a hover control circuit for incorporation into a radar altimeter is provided. The hover control circuit comprises a range gate configured to process a portion of the samples of the radar return signals according to a gate width and a gating interval of the range gate and a filter configured to receive samples from the range gate, where the filter is further configured to integrate the received samples. The hover control circuit further comprises an I/Q mixer configured to mix the integrated samples down to a base band frequency signal having both in phase and quadrature phase components, and a fast Fourier transform (FFT) unit configured to convert the in phase and quadrature phase components to a Doppler frequency function. The hover control circuit also comprises a spectral analyzer configured to determine a width and a center frequency of the Doppler frequency function.

In yet another aspect, a system for maintaining a vertical and horizontal position of a vehicle is provided which comprises a flight control computer and a radar altimeter comprising a hover hold controller. The hover hold controller configured to receive samples of radar return signals, and further configured to generate and output a frequency spectrum having a width and a center frequency based on the received samples. The width of the frequency spectrum is based on a horizontal velocity of the vehicle incorporating the radar altimeter, and the center frequency is based on a vertical velocity of the vehicle. The frequency spectrum is utilized to provide vehicle direction corrections to the flight control computer.

DETAILED DESCRIPTION OF THE INVENTION

A radar altimeter configured for hover holding operations is described herein. Known radar velocimeter systems, which utilize multiple narrow beam antennas, determine the horizontal and vertical velocity vectors (in both amplitude and direction) in an open loop fashion. Specifically, the radar velocimeter systems do not interact with the aircraft controls. The radar altimeter configured for hover holding operations interacts with a flight control system or an autopilot function within the vehicle to determine a horizontal direction portion of a total velocity solution. The interaction includes dithering the horizontal direction control of the vehicle to provide very small changes in horizontal directions of the vehicle. The slight changes in horizontal directions of the vehicle, while not noticeable by a pilot of the vehicle, are detectable by the radar altimeter and results in a dithered Doppler frequency spectrum having a width that is utilized to cause a corresponding response in direction and velocity change. Through on going iterations of direction change and resulting observed spectral width change, the observed spectral width can be reduced to nearly zero Hertz in width. A zero Hertz spectral width is indicative of zero horizontal movement of the vehicle.

Figure 1:
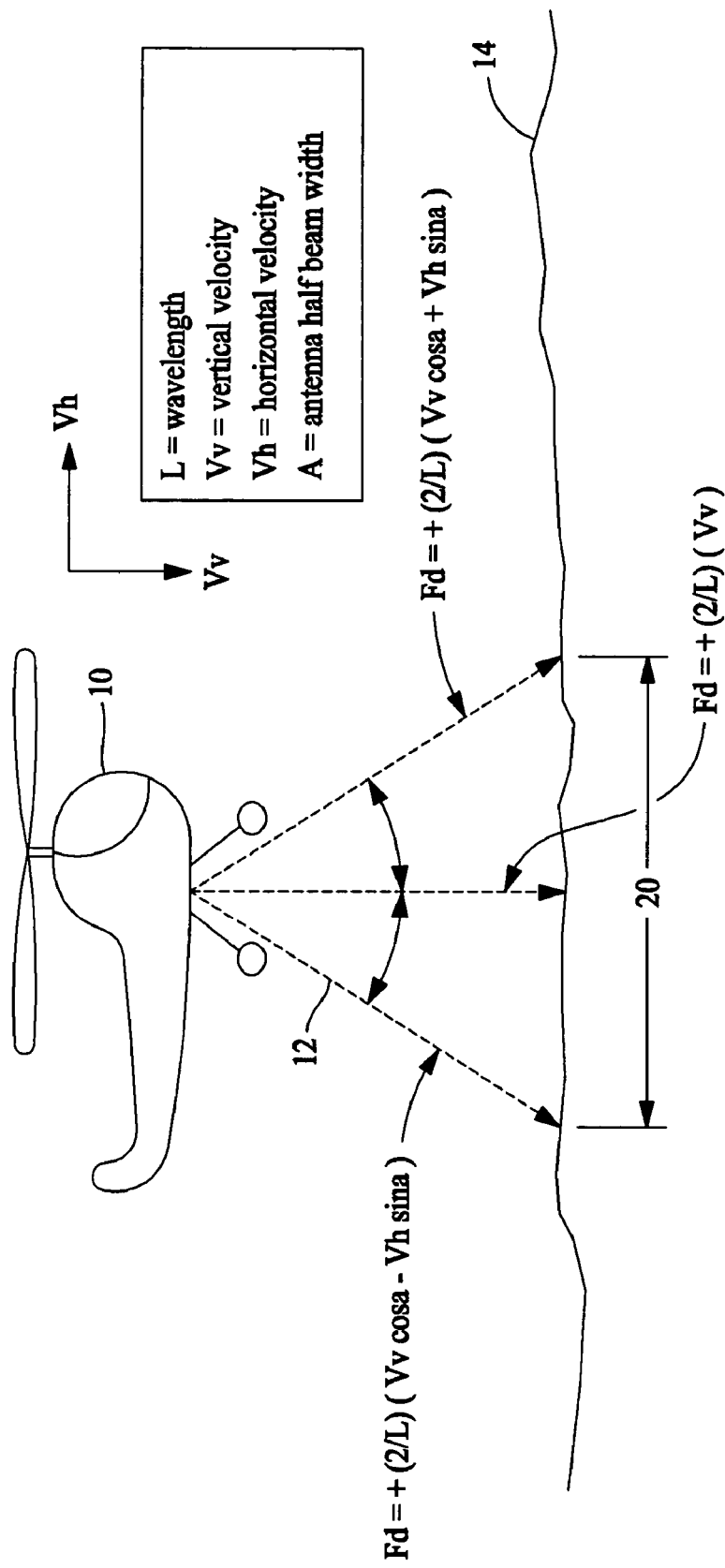
FIG. 1 is a diagram of a helicopter and illustrates Doppler frequency shifts as a function of incidence angle and vehicle velocity.

FIG. 1 illustrates a vehicle 10 which incorporates a radar altimeter (not shown) that is transmitting signals in a pattern 12 and receiving reflections of the transmitted signals from ground 14. FIG. 1 further illustrates Doppler frequency shifts as a function of incidence angle and vehicle velocity with respect to ground 14. More specifically, a Doppler frequency directly below the radar altimeter is given by $F_d=(2/L) \times V_v$ where L is the wavelength of the transmitted radar altimeter signal, and $V_v$ is the vertical velocity of helicopter 10. A Doppler frequency forward of helicopter 10 is given by $F_d=(2/L) \times (V_v \cos(a) + V_h \sin(a))$ where $V_h$ is the horizontal velocity of helicopter 10 and the variable "a" is a half beam width of the radar altimeter antenna. A Doppler frequency rearward of helicopter 10 is given by $F_d=(2/L) \times (V_v \cos(a) - V_h \sin(a))$. The total beam width (2×a) of the radar altimeter is directly proportional to an area 20 of ground 14 which is impinged by (and therefore reflects) radar transmissions. Area 20 is sometimes referred to as an "illuminated" area as it is the area impinged by and reflecting the radar transmissions.

Figure 2:
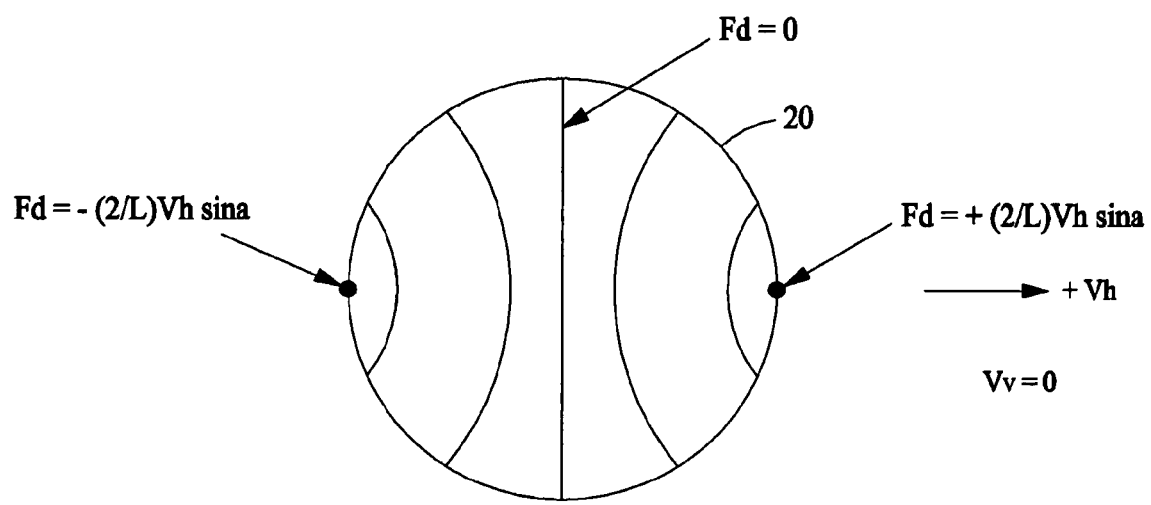
FIG. 2 illustrates a ground area reflecting transmissions from a radar altimeter which further illustrates lines of equal Doppler shift resulting from a fixed horizontal velocity and a zero vertical velocity.
Figure 3:
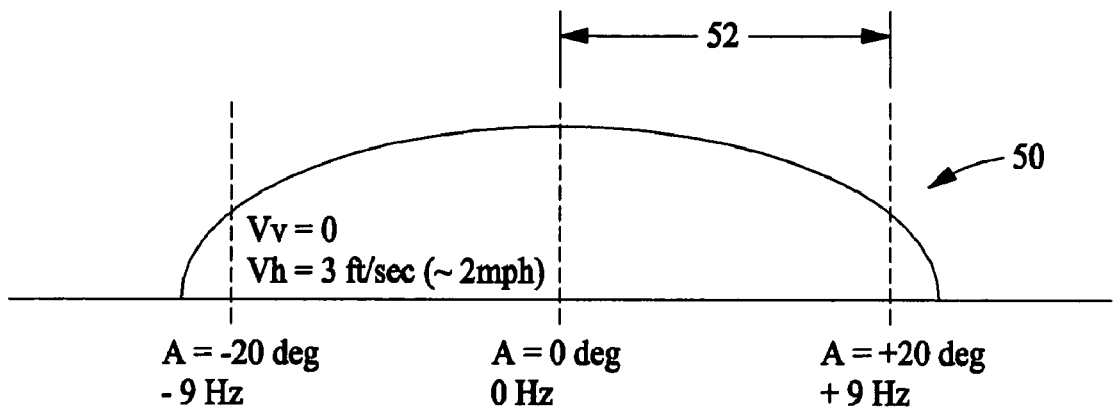
FIG. 3 illustrates a radar altimeter Doppler frequency spectrum having a width dependent on a horizontal velocity of the vehicle in which the radar altimeter is installed.

FIG. 2 illustrates area 20 on ground 12 that is impinged by (e.g., reflecting) transmissions from the radar altimeter within vehicle 10 (shown in FIG. 1). FIG. 2 also shows the lines of equal Doppler frequency shifts, sometimes referred as isodops, as a function of antenna beam width within illuminated area 20 with a vertical velocity of vehicle 10 at zero. More specifically, for zero vertical velocity, the Doppler frequency $F_d$ on the isodop directly below the radar altimeter, and to either side on a line perpendicular to the direction of travel is zero. The Doppler frequency forward of the radar altimeter is $F_d=(2/L) \times (V_h \sin(a))$, and the Doppler frequency rearward of the radar altimeter for zero vertical velocity is $F_d=-(2/L) \times (V_h \sin(a))$.

FIGS. 3 through 6 illustrate various Doppler frequency spectrums that result from radar altimeter antenna receptions from illuminated area 20 in response to various combinations of vertical and horizontal velocities for vehicle 10 and a radar operating at 4.3 Ghz resulting in a wavelength "L" of 0.229 ft. The radar altimeter configured to provide such spectrums is described below with respect to FIG. 7. Specifically referring to FIG. 3, spectrum 50 is centered at about zero Hertz, which represents a vertical velocity of about zero. A width of spectrum 50 is dependent on a horizontal velocity of air vehicle 10. The example of spectrum 50 indicates a horizontal velocity of about three feet/second. An antenna half beam width 52 is about twenty degrees. The width of spectrum 50 is directly related to the horizontal velocity and the antenna beam width as frequency half width=$(2/L) \times (V_h \sin(a) + V_v \cos(a)) = (2/0.229 \text{ ft}) \times (3 \text{ ft/sec} \times \sin(20)) = 9$ Hz.

Figure 4:
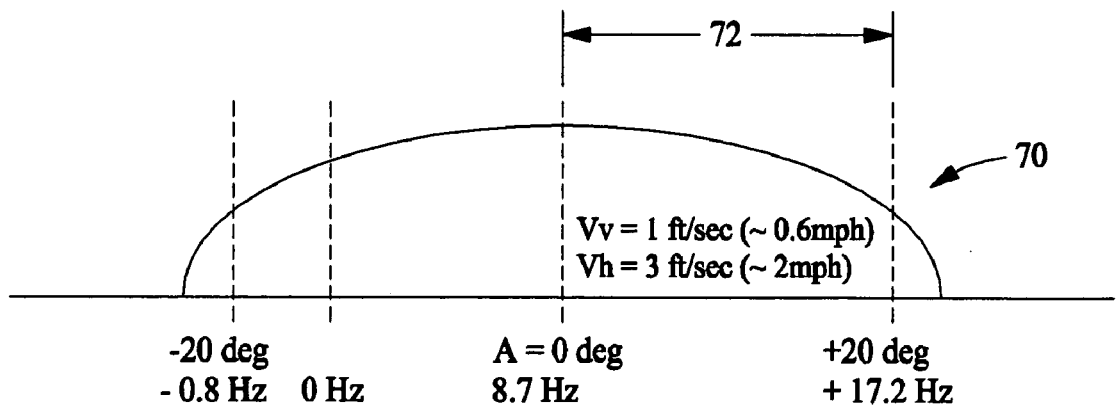
FIG. 4 illustrates a radar altimeter Doppler frequency spectrum that is centered away from zero Hertz due to a vertical velocity of the vehicle and a width dependent on horizontal velocity of the vehicle.

FIG. 4 illustrates a Doppler frequency spectrum 70 that is centered away from zero Hertz that represents a vertical velocity resulting from a vertical movement of vehicle 10. The positive shift in frequency spectrum 70 from zero Hertz to about 8.7 Hertz is caused by a positive Doppler frequency that results from a downward movement of air vehicle 10. Spectrum 70 is representative of a vertical velocity of about one foot/second and a horizontal velocity of about three feet/second and an antenna half beam width 72 of about 20 degrees. As above, a width of spectrum 70 is directly related to the horizontal velocity and the antenna beam width.

Figure 5:
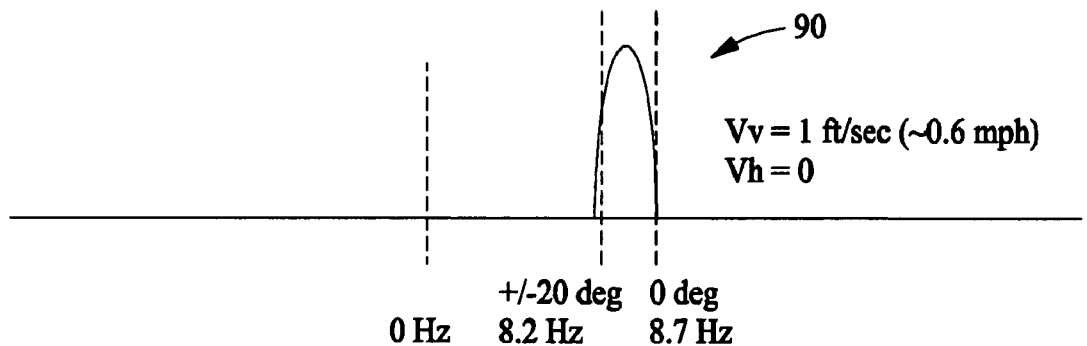
FIG. 5 illustrates a Doppler frequency spectrum that is centered away from zero Hertz due to a vertical velocity and narrowed due to a zero horizontal velocity.

FIG. 5 illustrates a Doppler frequency spectrum 90 that is centered away from zero Hertz and that represents a vertical velocity resulting from a vertical movement of vehicle 10. The positive shift in frequency spectrum 90 from zero Hertz is caused by a positive Doppler frequency that results from downward movement. Alternately, a negative shift to the Doppler frequency spectrum would result in response to an upward movement of vehicle 10. Removing the vertical velocity component is then, accomplished by upward correction to positive shifts, and conversely downward corrections to negative spectral shifts. The narrowing of spectrum 90, as compared to spectrums 50 and 70, is due to the reduction of the horizontal velocity to about zero as shown.

Figure 6:
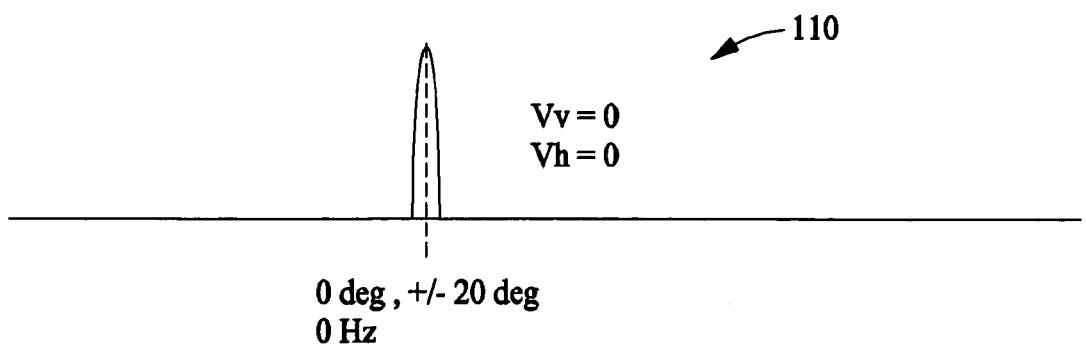
FIG. 6 illustrates a Doppler frequency spectrum that represents a zero vertical velocity and a zero horizontal velocity.

FIG. 6 illustrates a narrowed Doppler frequency spectrum 110 that is centered at zero Hertz. Frequency spectrum 110 represents an approximate zero vertical velocity and an approximate zero horizontal velocity for vehicle 10 (shown in FIG. 1). Reduction of vertical velocity to about zero and reduction of horizontal velocity to about zero results in frequency spectrum 110, which is representative of a desired frequency spectrum resulting from a desired hover mode of operation. Specifically, frequency spectrum 110 is about zero Hertz wide and centered at about zero Hertz. The narrow width of frequency spectrum 110 is illustrative of nearly no movement of vehicle 10 either vertically or horizontally, and in one embodiment is a result of continuous horizontal dithering of the flight control system by the radar altimeter to maintain the desired hover condition.

Referring to FIGS. 3–6, hover control, in the horizontal plane, is therefore an attempt to reduce, to about zero Hertz, a width of the frequency spectrum produced by the radar altimeter incorporating the hover hold controller. Reduction of frequency spectrum width is the result of a horizontal velocity approaching zero, and representative of vehicle 10 maintaining its horizontal position. Spectrum width reduction is accomplished by dithering the horizontal control of a flight control system (as further described below) through a number of directions in order to find the direction to which the width of the frequency spectrum is most responsive. Once the most responsive direction is determined, velocity corrections are made in the determined direction to approximate zero horizontal velocity. In one embodiment, the process is continuously repeated by iterations of velocity control change, sensing the resulting spectral change, and making the desired velocity change. Continuous iterations result in very small dithered velocity directional changes, which may not even be noticed by a pilot of vehicle 10, but are detectable by the radar altimeter Doppler-processing system.

Figure 7:
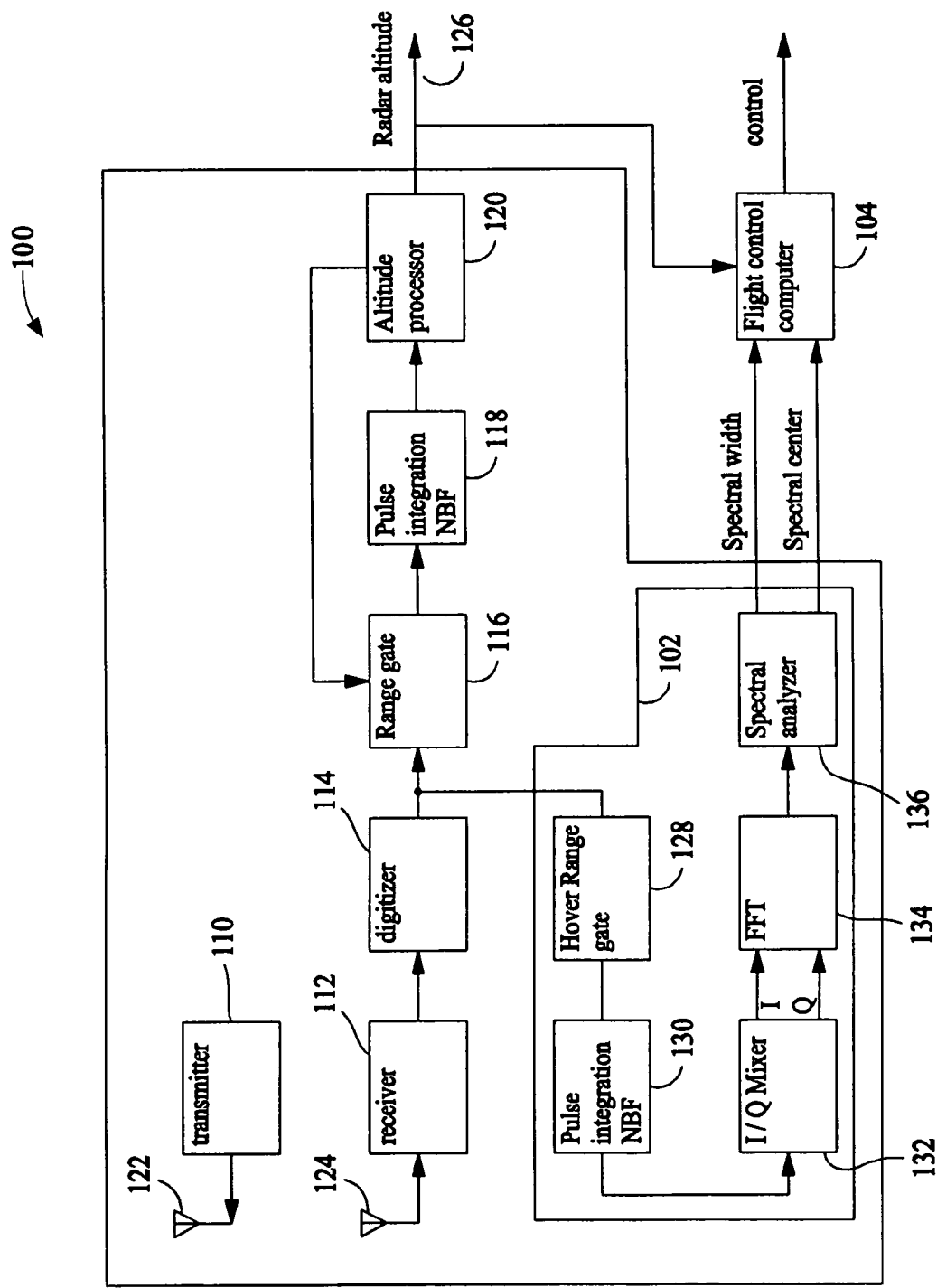
FIG. 7 is a block diagram of a radar altimeter incorporating a hover hold controller.

FIG. 7 is a functional diagram of a digital radar altimeter 100 which includes added hover hold controller 102 which interface with a flight control computer 104 or a similar flight control system. Radar altimeter 100 further includes a transmitter 110, a receiver 112, a digitizer 114, a range gate 116, a band pass filter 118, and an altitude processor 120.

Transmitter 110 transmits pulses of RF energy (e.g., radar signals) through transmit antenna 122. Receive antenna 124 receives the radar signals that are reflected from ground 14 (shown in FIG. 1). The received radar signals are amplified, mixed down to an intermediate frequency, and band limited by receiver 112. Digitizer 114 digitizes the received signals and outputs the digitized samples for altitude processing to altitude range gate 116.

Radar range (e.g., amplitude) is determined by utilizing an amount of time it takes for a radar pulse to travel from transmit antenna 122 to ground 14, to reflect off ground 14, and then return to receive antenna 124 as a radar return signal. Altitude range gate 116 is essentially a switch that only allows selected samples of the return signals received to be processed. In some contexts, a "gate" implies a switch that may be closed for a finite length of time during the gating interval, but in the digital signal processing context, gates correspond to discrete samples taken within the gating interval.

The return signal can not get through the gate until the point in time at which the switch is closed. For example, if a radar gate is set to a range of 1000 feet, the switch will close about two microseconds (which is the amount of time corresponding to radar signals traveling a distance of about 2000 feet) after transmission, to allow the sampled return signal to pass through. A radar range, as used herein, is an altitude. Therefore a radar range of 1000 feet describes radar signals traveling from a transmit antenna 1000 feet to the ground, reflecting, and traveling back 1000 feet to the receive antenna of the radar altimeter, or 2000 feet total. The time the switch is closed is referred to as a gate width and the time between individual switch closures is referred to as a gating interval. Altitude processor 120 sets the gating interval and gate width of range gates 116 as shown. Pulse integration narrow band filter 118 integrates the gated return pulses into a continuous wave signal which is output to altitude processor 120 which generates a signal indicative of radar altitude 126.

With respect to hover hold controller 102, a hover range gate 128 is incorporated to illuminate the entire antenna beam illuminated surface (e.g., ground area 20). Hover range gate 128 is considerably wider (the switch is closed for a longer time) than is altitude tracking gate 116, since altitude tracking gate 116 is set to a minimum width for best altitude accuracy. Pulse integration NBF filter 130 integrates the gated return from hover range gate 128 in a similar fashion as pulse integration narrow band filter 118, there by providing a continuous wave (CW) output to I/Q mixer 132 within hover hold controller 102. I/Q mixer 132 then mixes the CW down to a signal at a base band frequency having both in phase (I) and quadrature (Q) phase components for positive and negative Doppler frequency determination. A fast Fourier transform (FFT) unit 134 converts the sampled time function (e.g., in phase (I) and quadrature (Q) phase components) to a base band or Doppler frequency function resulting in the Doppler frequency spectrums previously described. Spectral analyzer 136 determines a width and a center of the resulting frequency spectrum to be utilized by flight control computer 104 to provide flight control changes required for maintaining a position during hovering operations.

A number of samples per interval within FFT unit 134 for a fixed sample frequency determines the spectral frequency resolution and the resulting hover error. The number of samples per interval also determines total sampling interval time. In order to provide the desired high frequency resolution for minimal error, and also provide a reasonable system, a dual sample frequency system is included within FFT unit 134 in one embodiment. Specifically, one high sample frequency FFT is utilized to determine an approximate maximum measured Doppler frequency. The approximate maximum measured Doppler frequency is then utilized to determine a minimum allowable sample frequency for a spectral analyzer FFT, which results in the sample frequency decreasing as the total velocity decreases and resulting in increased resolution as vehicle 10 nears the hover zero vertical and horizontal velocity conditions.

While the invention has been described in terms of various specific embodiments, those skilled in the art will recognize that the invention can be practiced with modification within the spirit and scope of the claims.

What is claimed is:

1. A method for maintaining a position of a hovering vehicle, the hovering vehicle incorporating a radar altimeter, said method comprising:
   changing a horizontal direction control of the vehicle to provide a horizontal direction change;
   receiving signals at the radar altimeter based on the change of horizontal direction;
   operating the radar altimeter to generate a Doppler frequency spectrum based on the received signals; and
   determining a change in vehicle direction and velocity which will reduce a width of the Doppler frequency spectrum of the received signals.

2. A method according to claim 1 wherein changing a horizontal direction control of the vehicle comprises dithering the horizontal direction control through a number of directions to find a direction which results in the largest change in the width of the Doppler frequency spectrum.

3. A method according to claim 1 further comprising determining a horizontal direction portion of a velocity of the vehicle based on a width of the Doppler frequency spectrum.

4. A method according to claim 1 wherein generating a Doppler frequency spectrum based on the received signals comprises:
   gating and integrating digitized samples of the received signals;
   mixing the gated and integrated signals into a base band signal having in-phase components and quadrature phase components; and
   transforming the in-phase components and quadrature phase components into a Doppler frequency spectrum.

5. A method according to claim 4 further comprising:
   determining a width and a center frequency of the Doppler frequency spectrum; and
   outputting the Doppler frequency spectrum width and center frequency to a flight control system.

6. A method according to claim 5 wherein determining a change in vehicle direction and velocity comprises utilizing the Doppler frequency spectrum width and center frequency to provide flight control changes to a vehicle.

7. A method according to claim 1 further comprising determining a vertical direction portion of a velocity of the vehicle based on a center frequency of the Doppler spectrum.

8. A radar altimeter comprising:
   a receiver section that, in operation, outputs samples of radar return signals; and
   a hover hold controller configured to receive the samples, gate and integrate the samples, said hover hold controller configured to generate and output a frequency spectrum having a width and a center frequency from the gated and integrated samples, the width based on a horizontal velocity of the vehicle incorporating said radar altimeter, the center frequency based on a vertical velocity of the vehicle.

9. A radar altimeter according to claim 8 wherein said hover hold controller comprises:
   a hover range gate configured process a portion of the samples of the radar return signals according to a gate width and a gating interval of said hover range gate;
   a filter configured to receive samples from said hover range gate, and further configured to integrate the received samples;

a mixer configured to receive the integrated samples and output in-phase components and quadrature components of the integrated samples;

a transform unit configured to receive the in-phase components and quadrature components and convert the components to a Doppler frequency spectrum; and a spectral analyzer configured to determine a width and a center frequency of the Doppler frequency spectrum.

10. A radar altimeter according to claim 9 wherein said spectral analyzer is further configured to output the width and center frequency to a flight control unit.

11. A radar altimeter according to claim 9 wherein said transform unit is configured to:

measure an approximate maximum Doppler frequency; and determine a minimum allowable sample frequency for said spectral analyzer.

12. A system for maintaining a vertical and horizontal position of a vehicle, said system comprising:

a flight control computer; and a radar altimeter comprising a hover hold controller, said hover hold controller configured to receive samples of radar return signals, said hover hold controller further configured to generate and output a frequency spectrum having a width and a center frequency based on the received samples, the width based on a horizontal velocity of the vehicle incorporating said radar altimeter, the center frequency based on a vertical velocity of the vehicle incorporating said radar altimeter, said frequency spectrum utilized to provide direction corrections to said flight control computer.

13. A system according to claim 12 wherein said hover hold controller comprises:

a hover range gate configured process a portion of the samples of the radar return signals according to a gate width and a gating interval of said hover range gate;

a filter configured to receive samples from said hover range gate, and further configured to integrate the received samples;

a mixer configured to receive the integrated samples and output in-phase components and quadrature components of the samples;

a transform unit receiving the in-phase components and quadrature components of the samples and converting the components to a Doppler frequency spectrum; and a spectral analyzer configured to determine a width and a center frequency of the Doppler frequency spectrum.

14. A system according to claim 13 wherein said spectral analyzer is further configured to output the width and center frequency to said flight control computer.

15. A system according to claim 13 wherein said transform unit is configured to:

measure an approximate maximum Doppler frequency; and determine a minimum allowable sample frequency for said spectral analyzer.

16. A system according to claim 13 wherein a number of samples per interval within said transform determines a spectral frequency resolution and a sample interval time for said spectral analyzer.

17. A system according to claim 13 wherein said transform unit comprises dual sample frequencies.

18. A system according to claim 17 wherein a first sample frequency is utilized to determine an approximate maximum measured Doppler frequency.

19. A system according to claim 18 wherein the approximate maximum measured Doppler frequency is utilized to determine a minimum allowable sample frequency for said spectral analyzer.

* * * * *